United States Patent [19]

Scheeler et al.

[11] Patent Number: 4,597,705
[45] Date of Patent: Jul. 1, 1986

[54] AUTOMATIC STACKER

[75] Inventors: Fred Scheeler, Northfield; David C. Eisendrath, Evanston, both of Ill.

[73] Assignee: Colborne Manufacturing Company, Glenview, Ill.

[21] Appl. No.: 623,383

[22] Filed: Jun. 22, 1984

[51] Int. Cl.⁴ .............................................. B65G 57/30
[52] U.S. Cl. .......................................... 414/30; 414/96
[58] Field of Search ................... 414/30, 92, 95, 96

[56] References Cited

U.S. PATENT DOCUMENTS

| 2,603,363 | 7/1952 | Bongiovanni | 414/96 |
| 3,160,292 | 12/1964 | Albrecht | 414/96 X |
| 3,659,695 | 5/1972 | Reese | 414/96 X |
| 3,765,546 | 10/1973 | Westerling | 414/96 |
| 3,866,763 | 2/1975 | Alduk | 414/96 X |

FOREIGN PATENT DOCUMENTS 2344580 3/1975 Fed. Rep. of Germany ........ 414/96
423649 9/1974 U.S.S.R. ................................ 414/96

Primary Examiner—Leslie J. Paperner
Attorney, Agent, or Firm—Charles W. Rummler; John B. Lungmus

[57] ABSTRACT

The herein disclosed invention relates to a device for automatically stacking in preselected multiples nestable, or other rigid forms, having a generally uniform size and a generally horizontal margin or rim, such as pie shells have. The stacking device is intended to be placed over, or structurally attached to, a conveyor means moving the items to be stacked into a location within the stacking device where they will be picked up and lifted vertically upward, one at a time, as they enter the pick-up location in a uniformly or randomly spaced relation, and held in the raised position until a preselected count is achieved, whereupon the stack of items will be automatically discharged onto the conveyor means or other suitable reception means from which the stack can be transferred to a packaging operation.

5 Claims, 17 Drawing Figures

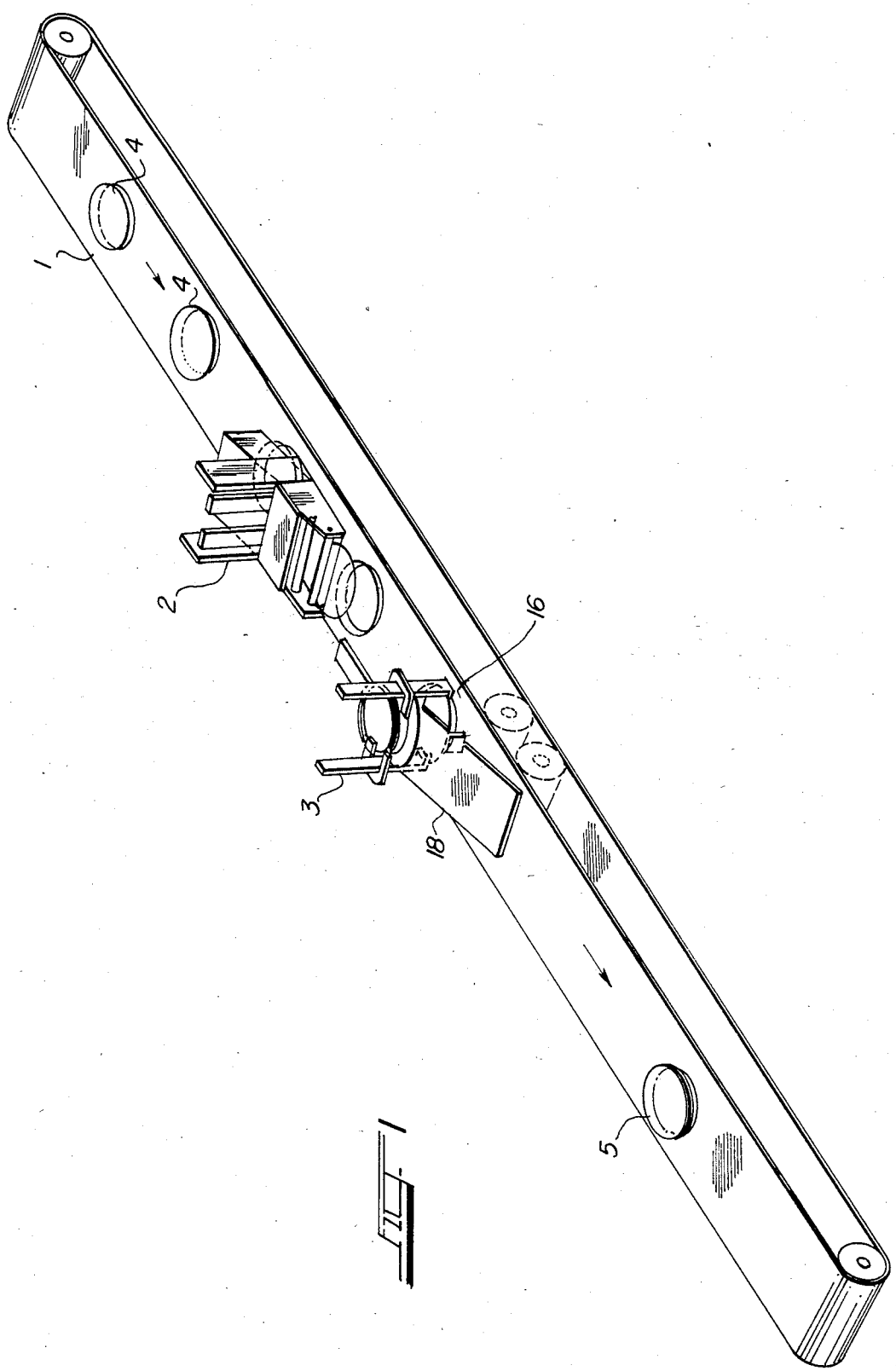

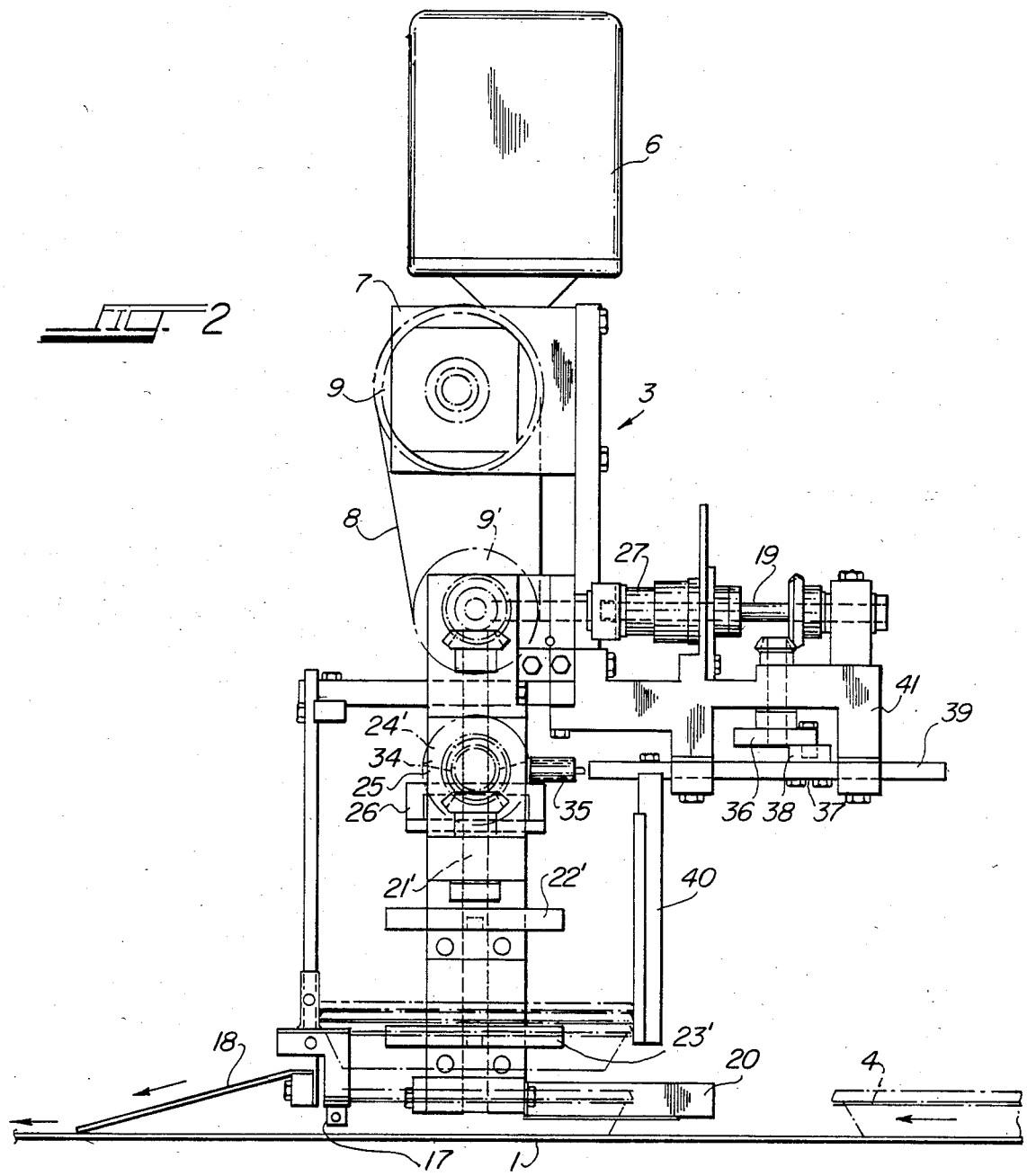

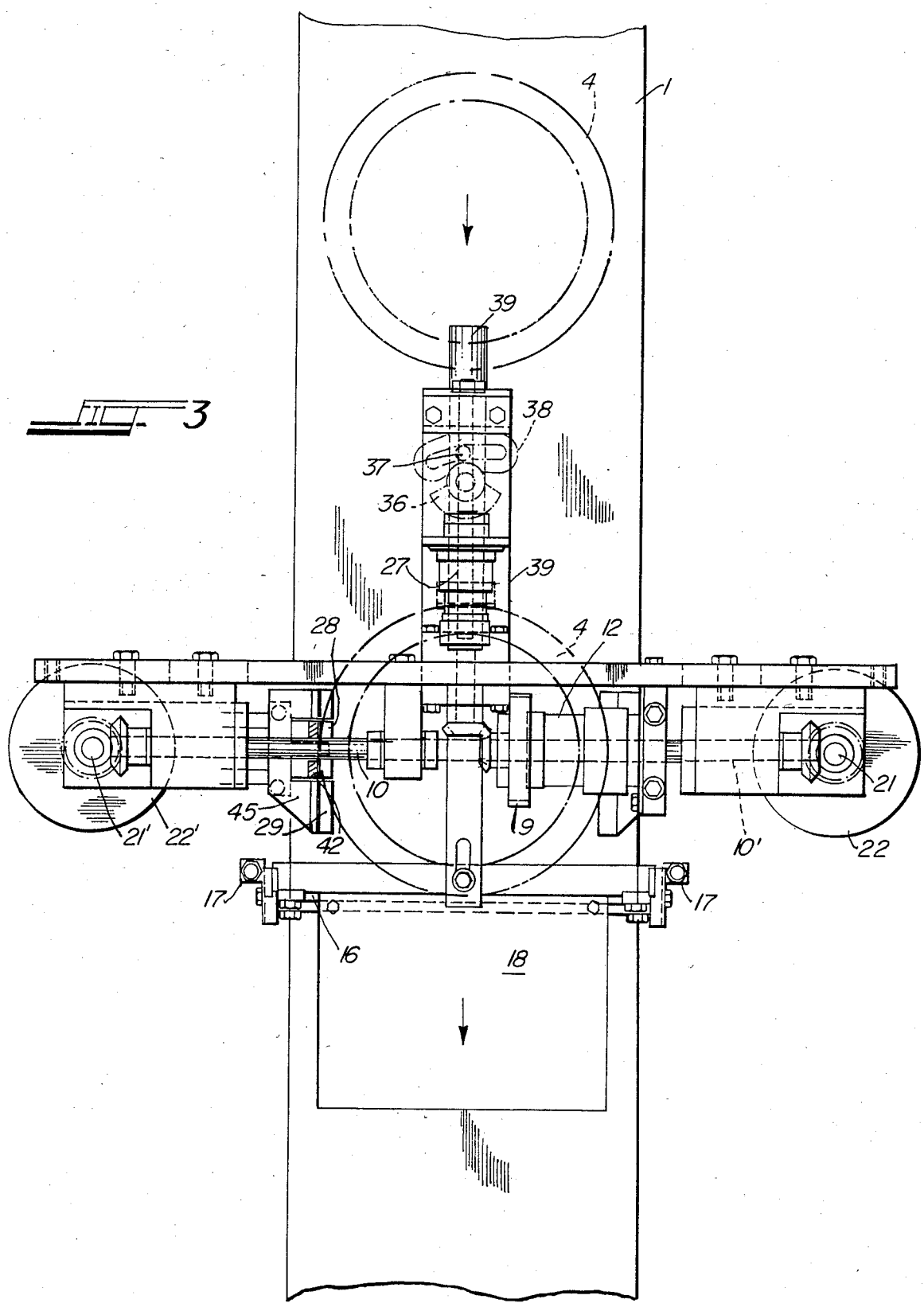

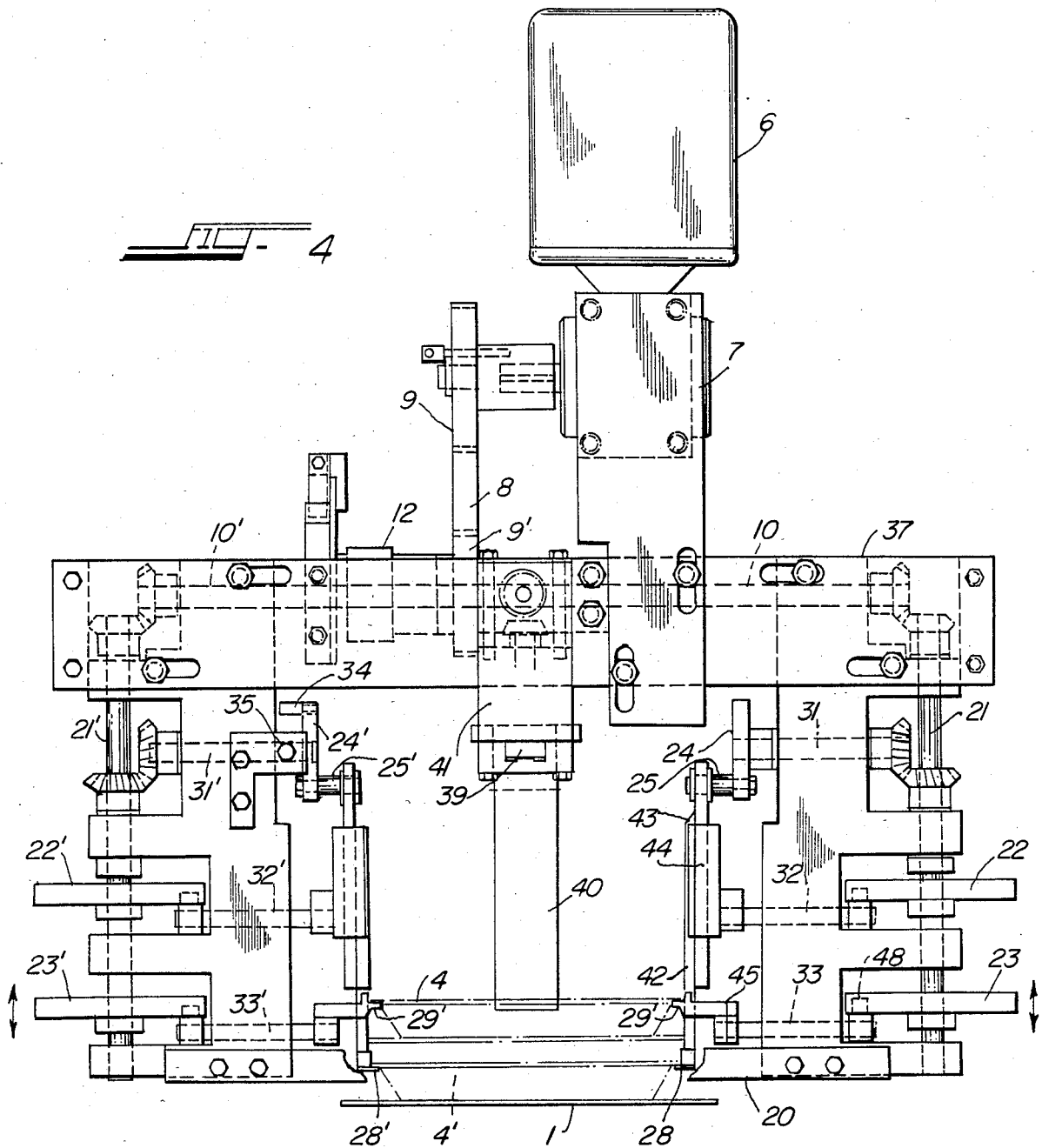

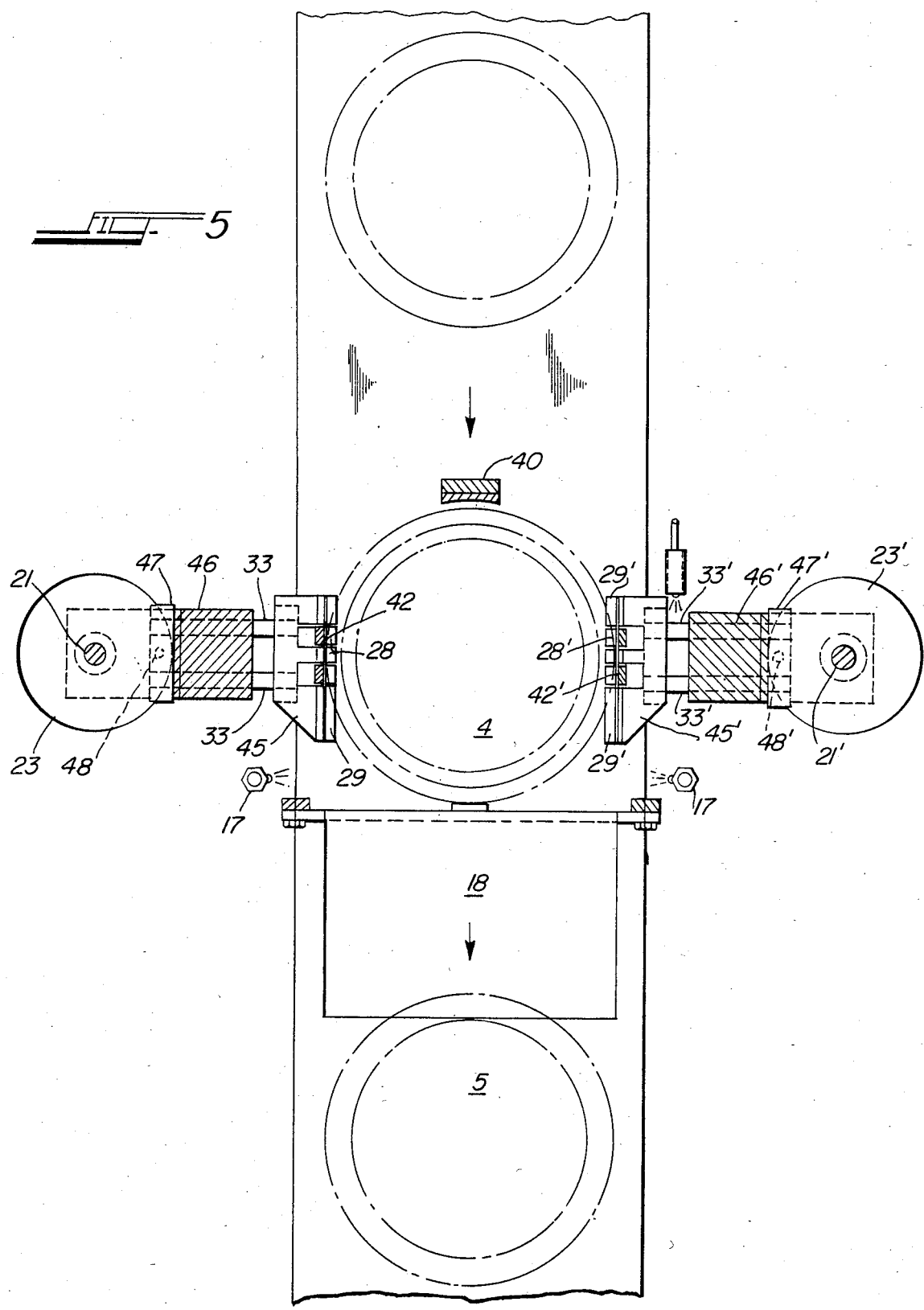

AUTOMATIC STACKER

BACKGROUND OF THE INVENTION

The present invention was primarily devised as a means for automatically stacking a predetermined number of pie shells in nested relation for subsequent packaging. Heretofore, pie shells were manually stacked in predetermined numbers per stack as they were delivered to the stacking operation by suitable conveyor means and then transferred to a packaging operation and storage. This was a relatively slow and costly operation because of the need for manual labor and it was with the object of materially increasing the speed and reducing the cost of packaging predetermined numbers of pie shells that the present invention was devised.

Also, because the pie shells were delivered to the stacking operation in a more-or-less randomly spaced order, a further object of the invention was to devise an automatic stacker, readily adjustable for any particular count of items per stack, that would be particularly independent of the order in which the items to be stacked were delivered to the stacker mechanism and to design the stacker mechanism so that it would be capable of high speed operation and therefore adaptable to accommodate the items to be stacked wholly independently of the rate at which such items might be delivered to the stacking mechanism.

SUMMARY OF THE INVENTION

In the form of the invention herein shown and described, the automatic stacking mechanism is embodied in an inverted U-shaped structure, the legs of which straddle a conveyor on which the items to be stacked are carried to a predetermined location between the legs of the stacker, stop means being provided whereby the items to be stacked are precisely positioned for the stacking operation. The legs of the stacking device house like, but oppositely acting, means for engaging the item to be stacked on opposite sides and lifting the item to an elevated position where it is deposited on holding means to be retained while the lifting means is returned to the lower position for engaging and lifting another of the items to be stacked. When the second item has reached the pick-up location between the stacker mechanism legs, the second item is engaged by the lifting means and raised upwardly to the elevated or stacking position where the second item is engaged with the under side of the first item, at which point the two items become deposited upon the holding means to be retained while the lifting means returns to its initial position ready to engage and lift the next of the items delivered to the lifting position by the conveyor means. This process of lifting an item, raising it to the elevated position, and resting the item on the holding means is repeated time after time until the desired number of items becomes held by the holding means, at which point automatic kicker means push the stacked items off the holding means and onto suitable means for delivering the stack of items for further processing, such as packaging for storage or shipment.

The lifting means comprises retractable lifting fingers projecting from the stacker means legs and over the conveyor means at the predetermined lifting location for engaging the item to be stacked on the under side of the margin or rim portion of the item for lifting the item to the elevated stacking position. The lifting operation of the lift means is performed by suitable means carried by the legs of the stacker mechanism, which means is actuated by sensor means which operates at the instant that an item to be stacked is delivered to the lifting position between the stacker mechanism legs. This elevating mechanism is designed to operate continuously from the start of the lifting operation through the depositing of the lifted item on the holding means and then returning the lifting means to the start position adjacent the conveyor means; and this lifting and depositing cycle of the lifting means is designed to operate time after time as it is actuated by the sensor means when an item to be stacked has reached the predetermined lifting location.

The holding means for the items to be stacked is actuated in timed relation with the operation of the lifting means so as to be retracted just before the item being lifted reaches the elevated or stacking position so that any items previously deposited upon the holding means can be dropped a small distance onto the top of the item being lifted, the lifting operation continuing until the item being lifted reaches the predetermined stacking elevation, at which point the holding means is projected to be in position to support the stacked items while the lifting means is being returned to its initial position.

The mechanism for operating the lifting fingers and the holding means in timed relation with each other is powered by a single motor which is cross-connected to the mechanism in each of the legs of the stacker mechanism and while the motor operates continuously, it works through a single revolution clutch which is triggered by the work positioning sensor to drive the stacker mechanism through one complete cycle. In this manner, the stacker mechanism operates only when an item to be stacked is carried by the conveyor means to the pick-up position, or location, where the sensor means functions to cause a full cycle of operation of the stacker mechanism. The operation of the stacker mechanism is thus wholly independent of the spacing of the items to be stacked as they are transported by the conveyor means to the pick-up position. This permits random feed to the lifting location of the items to be stacked and the stacker mechanism can be operated as rapidly or as infrequently that the items to be stacked are delivered to the pick-up position.

DESCRIPTION OF THE DRAWINGS

A specific embodiment of this invention is shown in the accompanying drawings, in which:

FIG. 1 is a perspective view of a system for stacking pan carried pie shells in predetermined multiples for subsequent packaging;

FIG. 2 is a side elevation of the stacker assembly showing its relation with a conveyor means for transporting the items to be stacked;

FIG. 3 is a plan view of the stacker device according to the present invention and its relation with the conveyor means;

FIG. 4 is an elevational view of the stacker device embodying this invention looking downstream of the conveyor means for delivering the items to be stacked to the stacking mechanism;

FIG. 5 is a sectional plan view of the stacker device as taken through the apparatus at the level of the line X—X in FIG. 4.

DESCRIPTION OF AN EMBODIMENT OF THE INVENTION

Figure 6A:
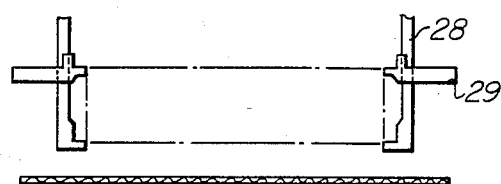
FIGS. 6A through 6L illustrate the sequential action of the lifting means and the elevated position holding means as they perform their respective operations in the course of stacking a series of the items to be stacked.

In the form shown in the drawings, the stacking device, or mechanism, is designed to be mounted over a conveyor means for delivering sequentially the items to be stacked as shown generally in FIG. 1 of the drawings, which illustrates a conveyor means 1 for carrying pie shells 4 successively to the stacker device 3, from which the stacked pie shells 5 are delivered from the stacker device onto a chute 18 for delivery to the said conveyor means or other suitable reception device for subsequent delivery to a packaging operation, not shown. As indicated in FIG. 1, a stop means 16 is provided to locate the incoming pie shell containing pans precisely at the pick-up position of the stacker mechanism. FIG. 1 also shows an insert feeder of conventional design disposed upstream of the stacking device for delivery of a sheet of suitable material onto the pie shells, as they approach the stacker device, to prevent them from sticking together when in the stacked position, this sheet feeder means being entirely optional and is not an element of the present invention.

Referring to FIGS. 2 and 3, the incoming pie shell carrying pans 4 traveling on the conveyor means 1 will enter the stacker mechanism 3 through side guides 20, for proper sidewise alignment, and will be stopped when the leading edge of the pan 4 engages the stop 16 thus becoming precisely located relative to the stacker device for the automatic pick-up and stacking operation of the device. Immediately prior to stopping, the pie pan will be electronically, or mechanically, detected by a photo eye or proximity detector 17 to signal the initiation of the pick-up action of the device which begins immediately through the action of closed cams 22-22' and closed cams 24-24'. The stacking mechanism is driven by a continuously operating electric motor 6 which, through a gear reducer 7, drives pulleys 9 and 9' which are connected together by a belt 8. The driven pulley 9', in combination with bevel gears, drives respective input shafts 10-10' connected through an electrically trippable single revolution clutch 12, and thence to vertical shafts 21 and 21' mounted on respective legs of the stacker assembly and which drive closed cams 22-22' and 23-23'.

The clutch 12 is activated by the incoming pie shell 4 passing the detector means 17 thus causing a rapid single revolution of power input shafts 10-10' (FIGS. 3 and 4) which, through the action of bevel gears, causes a single rotation of the vertical shafts 21-21' and associated closed cams 22-22', as well as shafts 31-31' and associated closed cam plates 24 and 24'. The cams 24-24', acting through respective crank pins 25, cause the raising and lowering of the pie shell lift fingers 28-28' and the cams 22-22', acting through slider arms 32-32', cause simultaneous in and out movement of the lift fingers 28-28'. The second set of closed cams 23-23', acting through respective slider arms 33-33', cause simultaneous in and out movement of the holding fingers 29-29', the action of which is in timed conjunction with the lift fingers 28-28'.

The complete action of the lift fingers 28 and holding fingers 29 will be apparent from the FIGS. 6A through 6L.

Referring to FIGS. 2 and 4, crank pin 34 on crank plate 24' passes across an electronic proximity sensor (or mechanical switch) 35 each time the crank plate 24' makes a single revolution to raise a pie shell with the lifting fingers 28-28'. This passage of the pin 34 across the proximity sensor 35 causes an electric signal to be given to a preset electrical counter, not shown, for each pie shell delivered onto the holding fingers 29-29' by the lifting fingers 28-28'. The electric counter is of a commercially available type adapted to be selectively set for any number and when the count of the pie shells and their carrying pans, raised to the holding position, reaches the preset number of pie shells to be stacked, an electric impulse is given by the counter to a solenoid operating a half revolution clutch 27 (FIGS. 2 and 3) which promptly engages shaft 19 and causes a single rapid revolution of plate 36 through appropriate bevel gears. The crank pin 37 on crank plate 36 drives a cam plate 38 fixed to a push-off slide bar 39 carried in frame 41 projecting rearwardly from the main stacker frame. The push-off slide bar 39 in turn carries a downwardly extending push-off bar 40 so that the rapid in and out movement of the slide bar 39 resulting from engagement of the clutch 27 pushes the stack of pie shells on the holding fingers 29 off the said holding fingers and onto the discharge slide 18 and thence onto suitable means, such as an extension of the conveyor 1, from which the stack of pie shell plates may be delivered for packaging or other desired processing.

The arrangement of the lifting fingers 28-28' and the holding fingers 29-29' is best illustrated in FIGS. 4 and 5 and as shown in FIG. 4, it will be seen that, in operation, the lifting fingers 28-28' must pass through and upwardly beyond the holding fingers 29-29' and since the form, mounting and operation of the lifting and holding fingers, are, as shown, identical for each side of the stacking mechanism (i.e., each side of the conveyor 1), only the apparatus at the right hand side of FIG. 4 and at the left hand side of FIG. 5 will be described.

Referring particularly to FIG. 4, it will be seen that the lifting fingers 28 are mounted at the bottom end of a pair of vertically extending rods or shafts 42 which in turn have their upper ends mounted on a vertically extending slide bar 43 slidably mounted within and carried by a slide housing 44 attached to the slider arm 32 which connects with the closed cam 22 for in and out axial movement. As shown, the upper end of the slide bar 43 is connected by the crank arm 25 to the closed cam 24 which, by its rotation, moves the slide bar 43 in a straight line, up and down, to raise and lower the lifting fingers 28.

Since the lifting fingers 28 must, in operation, move toward and away from the object being lifted for stacking, the arrangement of slide housing 44, the slide shaft 32, and the closed cam 22 is such that a single rotation of the closed cam 22 will move the housing 44 a predetermined distance away from and then toward the rim of the object being raised and stacked, the upper end of the slide bar 43 being slidable axially on the crank pin 25 for that purpose. It will also be seen that rotation of the closed cam 24 will cause up and down movement of the lifting fingers 28 through a sufficient distance to raise the lifting fingers 28 upwardly and beyond the level of the holding fingers 29. The operation of the cams 22 and 24 during a single revolution is precisely timed, one with the other, to perform as hereafter described for FIG. 6.

The holding fingers 29, as seen in FIGS. 4 and 5, comprise integral extensions of a slide plate 45 which in turn is attached to a pair of the slide rods 33 which extend slidably through a support member 46 for connection with a cross bar 47 which in turn is connected with the closed cam 23 by a suitable cam follower 48. It will thus be seen that the finger member 45 works at a constant level relative to the conveyor 1 and in an in-out direction only.

As seen in FIGS. 3 and 5, the holding finger slide plate 45 is made with three outwardly and horizontally directed fingers spaced apart a sufficient distance laterally to pass the lifting finger shafts 42 in the course of their up and down movement and the length of the holding fingers 29 is sufficient to permit movement of the finger carrying members 42 in the horizontal direction away from the margin of the object being lifted for the purpose of releasing a lifted object onto the holding fingers 29, as will be explained in the description of the FIGS. 6A through 6L.

Referring now to the FIGS. 6A through 6L, it will be seen that FIG. 6A shows the holding fingers 29, lifting fingers 28 and the conveyor belt 1 awaiting an incoming pie shell carrying pan.

Figure 6G:
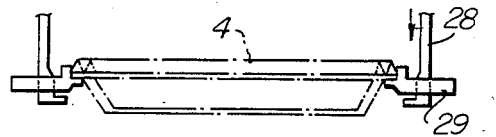
Figure 6B:
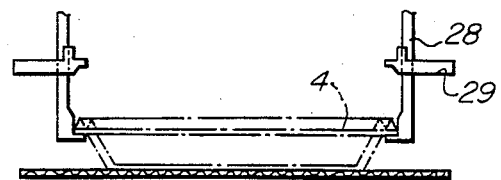

FIG. 6B shows a pie shell that has just arrived at the lifting position which is determined by the pan and pie shell engaging the stop 16.

Figure 6H:
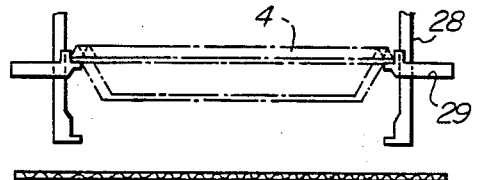
Figure 6C:
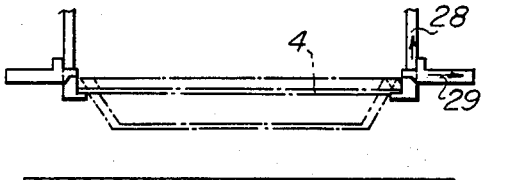

FIG. 6C shows a shell being lifted toward the elevated holding position while the holding fingers 29 are retracting to prevent interference with the rising pie shell and also to allow any pan previously stacked to drop a short distance into the rising pie shell carried by the lifting fingers 28.

Figure 6I:
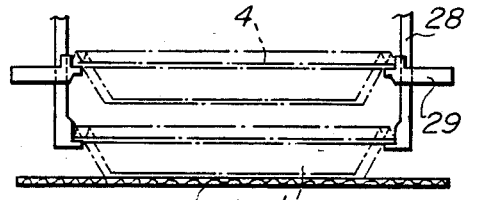
Figure 6D:
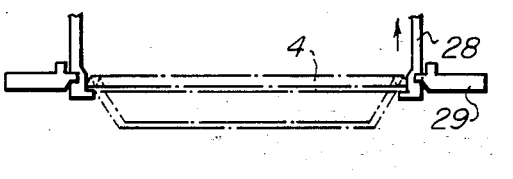

FIG. 6D is a continuation of the movements shown in FIG. 6C with the holding fingers 29 now fully retracted and clear of any interference with the rising pie shell.

Figure 6J:
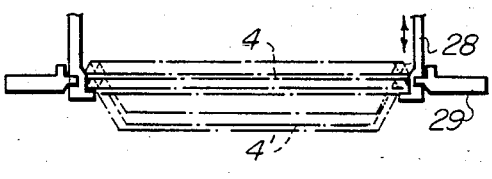
Figure 6E:
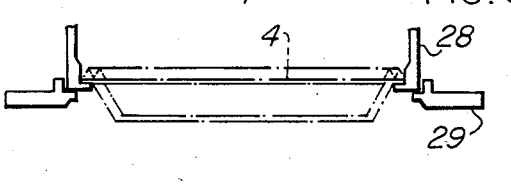

FIG. 6E shows the raised pie shell at its uppermost position and the holding fingers 29 ready to return to their normal holding position.

Figure 6K:
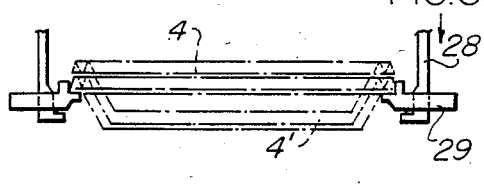
Figure 6F:
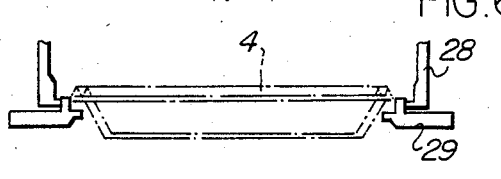

FIG. 6F shows the holding fingers 29 now returned to their normal holding position while the lifting fingers 28 have just retracted to release the raised pie shell to fall down onto the holding fingers 29 poised immediately below.

FIG. 6G shows the raised pie shell firmly resting on the holding fingers 29 while the lifting fingers 28 are returning downward to their initial or starting position.

FIG. 6H shows the lifting fingers 28 fully returned to their starting position to await the next incoming pie shell. Importantly, however, the transition from FIG. 6G to 6H does not show that the lifting fingers 28 remain in their withdrawn position, outwardly from the pie shell path, until they reach the level of the initial position shown in FIG. 6H. This assures that an incoming pie shell will not be obstructed in any way by the descending fingers 28.

FIG. 6I shows a second pie shell 4' having entered the precisely located stop position in the stacker device preparatory to being lifted by the lifting fingers 28.

FIG. 6J shows the previously held pie shell pan 4 having dropped from the holding fingers 29 onto the second pan 4' as it is being lifted toward the elevated position by the lifting fingers 28.

Figure 6L:
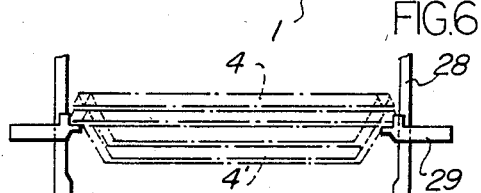

FIG. 6K shows the two nested pie shells 4 and 4' resting on the now extended holding fingers 29 while the retracted lifting fingers 28 are descending on their way toward the level of the initial or waiting position; and FIG. 6L shows the lifting fingers 28 finally returned to the starting or waiting position projected inwardly into the path of an incoming pie shell, as at the end of one complete cycle of the stacking mechanism, and awaiting another pie shell to be delivered, picked up, and stacked.

The arrows shown on or next to the elements 28 and 29 are intended to indicate the direction of movement of the elements at the illustrated stage of the stacking machine operation.

At the beginning of a stacking cycle of the mechanism, the lifting fingers 28 are arranged to move slightly inward toward the item to be picked up so that they actually pinch or bear against the edge or rim of the item to firmly grip the item as it is being lifted to the elevated or stacking position. This is done to achieve stability of the item while it is being accelerated and then decelerated during the raising portion of the operating cycle.

Although but one specific embodiment of this invention is herein shown and described, it will be understood that details of the construction shown may be altered or omitted without departing from the spirit of the invention as defined by the following claims.

We claim:

1. An automatic stacking machine for stackable articles which have a generally horizontal margin at each of opposite sides, said machine comprising an inverted U-shaped structure the legs of which straddle a conveyor means for delivering an article to be stacked to a fixed location between said legs, means on said machine for positioning a conveyor delivered article at said location, article lifting means projecting toward said location from each of said legs at a level to engage an article below its margin at said location, article holding means projecting from said legs in the direction of said lifting means and at a stacking position above and vertically aligned with said lifting means, means for operating said lifting means to engage the margin of and raise an article to above the level of said holding means, means to retract said holding means to pass said article and said lifting means and to then return the holding means to its initial projected position, and means for retracting said lifting means at the stacking position to deposit a lifted article onto said holding means and to then return the retracted lifting means to a level below and outwardly of the margin of an article at said fixed location and at that level return the lifting means to its initial position.

2. The stacking machine defined by claim 1 wherein the operation of the holding means is in timed relation with the operation of the lifting means whereby a stackable article is raised to stacking position while the holding means is being retracted to pass the article and the lifting means, the holding means is then returned to its initial position while the lifting means is retracted to deposit the article onto the holding means, and the retracted lifting means is then lowered to the level of the said location and thereafter returned to its initial position at said location in one uninterrupted cycle of lifting means operation.

3. The stacking machine according to claim 2 wherein the operation cycle of the lifting means is initiated solely by the positioning of an article at said location.

4. An automatic stacker for stackable items having a generally horizontal margin extending from each of its opposite sides, a conveyor means for transporting the stackable items toward the stacker in randomly spaced relation with each other, the stacker being an inverted U-shaped structure positioned above the conveyor and having its legs straddling the conveyor, means for receiving a stackable item at fixed location between the stacker legs, item lifting means on each of said stacker legs positioned to extend beneath the margins of said item at a first position and operable to lift the item to an elevated position above the conveyor and to then return to its first position, item holding means at a predetermined level below said elevated position and in the raising path of the lifted item, said holding means being adapted to receive and to hold the lifted item, means for retracting the holding means as the lifting means approaches the level of the holding means to allow the lifted item to pass to said elevated position and then projecting the holding means to its initial item holding position, and means for retracting the lifting means from engagement with the item margin upon return of the holding means to its initial position, the lifting means remaining retracted until near its first position and then moving inwardly to underlie the margin of an incoming item to be stacked.

5. A stacking machine according to claim 4 wherein an electrically actuated counting means is provided to individually register the stackable items deposited on said holding means, said counting means being adapted to produce an electrical signal when a predetermined number of said items has been deposited on the holding means, a downwardly extending slide mounted on said stacker structure adjacent the level of said holding means and extending forwardly therefrom, pusher means on said structure mounted rearwardly of items deposited and stacked on said holding means and adapted to engage the stacked items with a forwardly pushing motion, means for operating said pusher means with a forward and then rearward motion to push stacked items from the holding means and onto said slide, and means actuated by a signal from said counting means for actuating the pusher operating means.

* * * * *